US012709111B1

(12) United States Patent
Ahmed

(10) Patent No.: US 12,709,111 B1
(45) Date of Patent: *Aug. 18, 2026

(54) POSITIONING AID FOR A STAMPING TOOL

(71) Applicant: Tasnim Ahmed, Jamesville, NY (US)

(72) Inventor: Tasnim Ahmed, Jamesville, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 19/056,145

(22) Filed: Feb. 18, 2025

(51) Int. Cl.
*B41K 3/62* (2006.01)

(52) U.S. Cl.
CPC ...................................... *B41K 3/62* (2013.01)

(58) Field of Classification Search
CPC ... B41K 3/00; B41K 3/02; B41K 3/24; B41K 3/44; B41K 3/46; B41K 3/54; B41K 3/62
See application file for complete search history.

(56) References Cited

U.S. PATENT DOCUMENTS 8,393,266 B2 * 3/2013 Rasmussen ............... B41F 1/04 101/287
10,960,696 B1 * 3/2021 Garza ................... B44B 5/0052
11,014,389 B1 * 5/2021 Cottrell .................... B41K 3/46
11,059,312 B2 * 7/2021 Ericson .................... B41K 3/32
2007/0193049 A1 * 8/2007 Vetromila ................ G01B 3/04 33/436
2013/0206026 A1 * 8/2013 Konik ...................... B41K 3/62 101/368
2019/0135006 A1 * 5/2019 Ericson .................... B41K 3/46
2020/0114672 A1 * 4/2020 Garza ................... B44B 5/0052

FOREIGN PATENT DOCUMENTS

GB 2503660 * 1/2014

* cited by examiner

*Primary Examiner* — Christopher E Mahoney
*Assistant Examiner* — Marissa Ferguson-Samreth
(74) *Attorney, Agent, or Firm* — Barry Choobin; Patent 360

(57) ABSTRACT

An assembly for precise positioning of a stamping tool, such as a photopolymer stamp. The assembly has a flat base. A platform of a predetermined height runs along the periphery of the flat base. The platform comprises one or more removable side members. One or more side members can be removed from the base. A photopolymer film removably adheres to the top surface of the flat base. Four alignment tabs may be on the four corners of the platform. A flip plate dimensioned to fit over the platform, such as corners of the flip plate juxtapose with the alignment tabs. A portion of the flip plate extends sidewards from the periphery of the platform, such that the flip plate can be lifted.

10 Claims, 7 Drawing Sheets

POSITIONING AID FOR A STAMPING TOOL

FIELD OF INVENTION

The present invention relates to an assembly for positioning a stamping tool, and more particularly, the present invention relates to an assembly for positioning a photopolymer stamp on an artistic media.

BACKGROUND

Stamping is a common method for transferring patterns to artistic media, such as greeting cards, cardstock, and paper. The pattern can be engraved on a rubbery stamping tool which can then be used to print the pattern on multiple artistic media. First, the Ink can be transferred to the stamping tool which can then be applied to the destined object.

Acrylic and photopolymer stamps are generally available in a range of designs for arts and crafts. For example, premade stamps are available for printing an artistic design on a greeting card. Photopolymer stamps are advantageous over acrylic stamps being able to produce sharper and crispy patterns.

However, precisely aligning a stamp on an artistic media, such as a paper can be problematic. Additionally, it is common that the first attempt of stamping may not result in a clean impression, and repeated stamping may be needed. Realigning the stamping tool in the exact position as the previous position can be difficult.

Thus, a desire is there for an assembly that may allow precisely positioning a stamping tool on artistic media.

SUMMARY OF THE INVENTION

The following presents a simplified summary of one or more embodiments of the present invention to provide a basic understanding of such embodiments. This summary is not an extensive overview of all contemplated embodiments and is not intended to identify critical elements of all embodiments nor delineate the scope of any or all embodiments. The sole purpose of the summary is to present some concepts of one or more embodiments in a simplified form as a prelude to the more detailed description that is presented later.

The principal object of the present invention is therefore directed to an assembly for precisely positioning a stamping tool.

Another object of the present invention is that the assembly allows using paper of different sizes.

Still another object of the present invention is that the assembly is economical to manufacture.

A further object of the present invention is that large stamps can be used in any orientation.

A further object of the present invention is that a large paper can be used without trimming.

In one aspect, disclosed is an assembly for precise positioning of a stamping tool, such as a photopolymer stamp. The assembly has a flat base, preferably a square shape. A platform of a predetermined height runs along the periphery of the flat base. A photopolymer film may removably adhere to the top surface of the flat base. Four alignment tabs may be provided on the four corners of the platform. A flip plate dimensioned to fit over the platform, such as corners of the flip plate juxtaposed with the alignment tabs. A portion of the flip plate extends sidewards from the periphery of the platform so that the flip plate can be lifted. The clear flip plate has radial lines that extend from the center to the periphery of the flip plate.

In one aspect, the photopolymer film and the radial lines allow aligning the photopolymer stamp on the artistic media.

In one aspect, the height of the platform relative to the flat base is such as to accommodate the photopolymer film, artistic media, and the photopolymer stamp.

In one aspect, the thickness of the four alignment tabs can be more than the thickness of the flip plate.

In one aspect, the flip plate over the platform can be retained over the platform between the four alignment tabs, wherein the alignment tabs prevent even slight lateral movements of the flip plate over the platform.

In one aspect, the flip plate can be transparent or translucent.

In one aspect, disclosed is a method of stamping an artistic media using a photopolymer stamp, the method comprises providing an assembly for positioning a stamping tool. The assembly includes a frame that includes a base and an elevated platform. The base has a flat top surface and is dimensioned to receive artistic media. The elevated platform is along the periphery of the base, wherein the elevated platform is of a predefined height relative to a top surface of the base. The elevated platform includes one or more side members configured to be removably coupled to the base. The assembly includes a plurality of alignment tabs at the corners of the elevated platform. Each of the plurality of alignment tabs has an inner side. The assembly includes a flip plate dimensioned to fit over the elevated platform and between the plurality of alignment tabs, wherein the plurality of alignment tabs restricts lateral movement of the flip plate, wherein the flip plate is not fixedly fastened to the base. The assembly includes a photopolymer film configured to removably be placed onto the flat top surface of the base, the photopolymer film has a grid. The method further comprises removing a side member of the one or more side members from the base; placing the artistic media on the photopolymer film, the photopolymer film is on the flat top surface of the base; upon placing the artistic media, positioning the photopolymer stamp on the artistic media; upon positioning the photopolymer stamp, placing the flip plate on the flat platform and between the plurality of alignment tabs, such as the photopolymer stamp adhering to a bottom surface of the flip plate; removing the flip plate from the flat platform and thereafter inverting the flip plate; applying ink to an exposed surface of the photopolymer stamp adhered to the flip plate; and upon applying the ink, inverting, and repositioning the flip plate over the flat platform, such as the photopolymer stamp contacts the artistic media.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Figure 1:
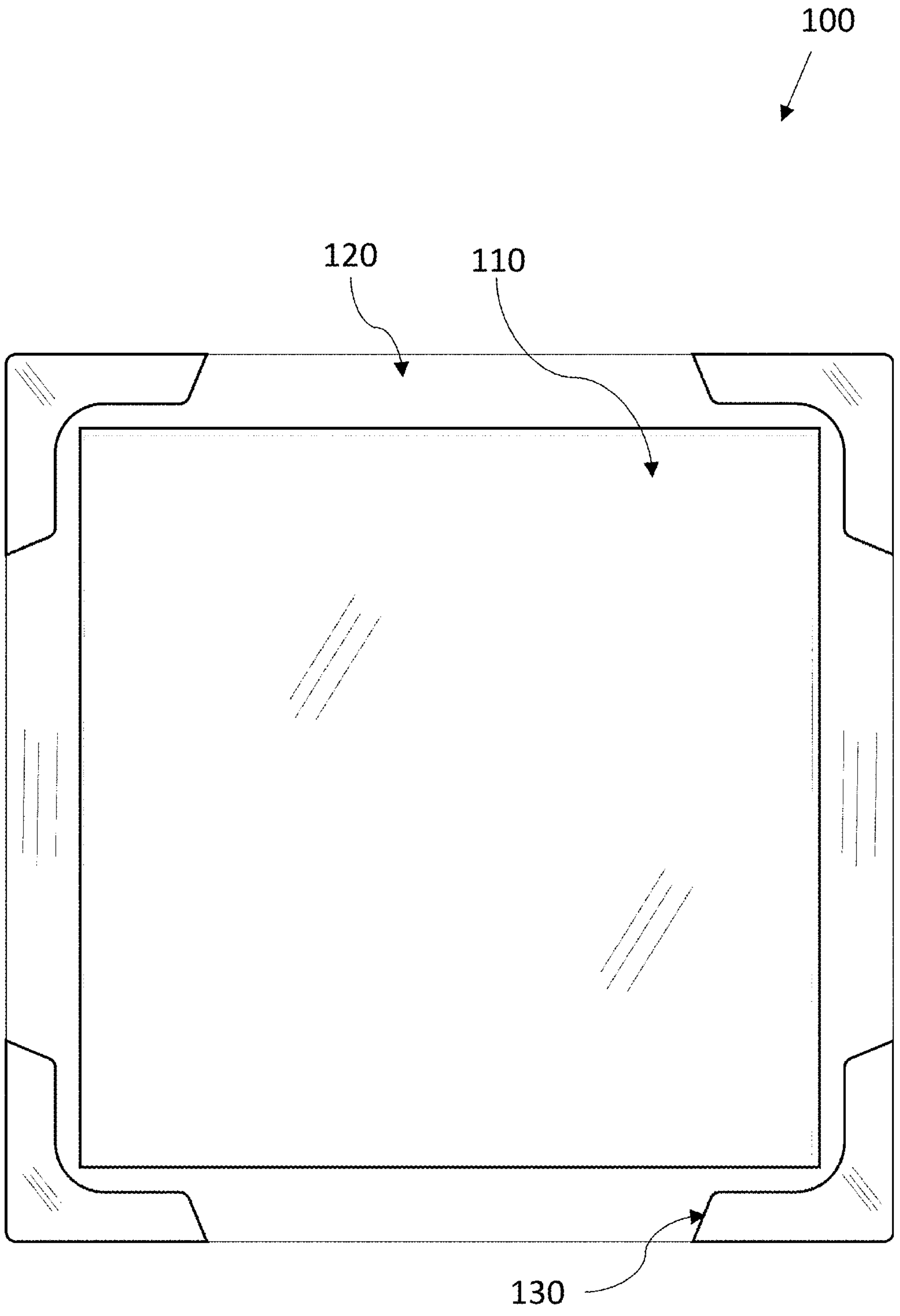
FIG. 1 shows a frame of the disclosed assembly having a flat base, a platform around the periphery of the flat base, and four alignment tabs at four corners of the platform, according to an exemplary embodiment of the present invention.

Referring to FIG. 1 which shows a frame 100 of the disclosed assembly. The frame 100 can have a flat base 110 preferably a square shape. The dimensions of the flat base 110 can be such as to receive an artistic media i.e., the area of the flat base can be more than the dimensions of artistic media. The artistic media can be card stock, invitation cards, contact cards, and the like. Around the flat base 110 may be a platform 120 that runs along the periphery of the flat base 110. The platform 120 may have a square periphery and a flat top surface. The height of platform 120 above the flat base 110 may be such that it accommodates a photopolymer film, artistic media, and the photopolymer stamp on the flat base. The height of the platform relative to the flat base can be proportional to the combined height of the photopolymer film, the artistic media, and the photopolymer stamp. Photopolymer stamps of standard thickness are generally available. The height of the platform relative to the base can be varied based on the standard sizes of the photopolymer stamps.

At four corners of the platform 120 can be seen four alignment tabs 130. The alignment tabs 130 can have a wall of predefined height and a top surface. The inner side of the alignment tabs can be round with diagonal cuts at the ends. The width of the alignment tabs can be less than the width of the platform.

Figure 6:
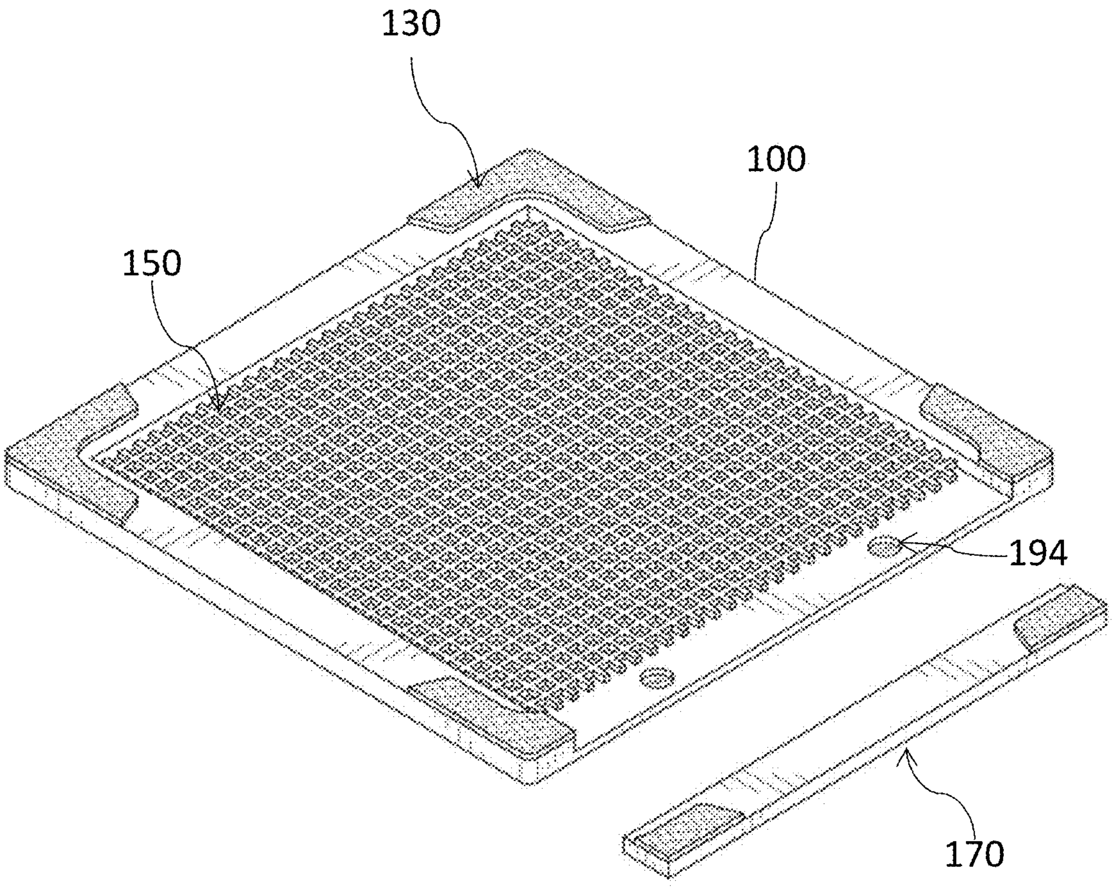
FIG. 6 shows a side member of the platform removed from the base, according to an exemplary embodiment of the present invention.
Figure 7:
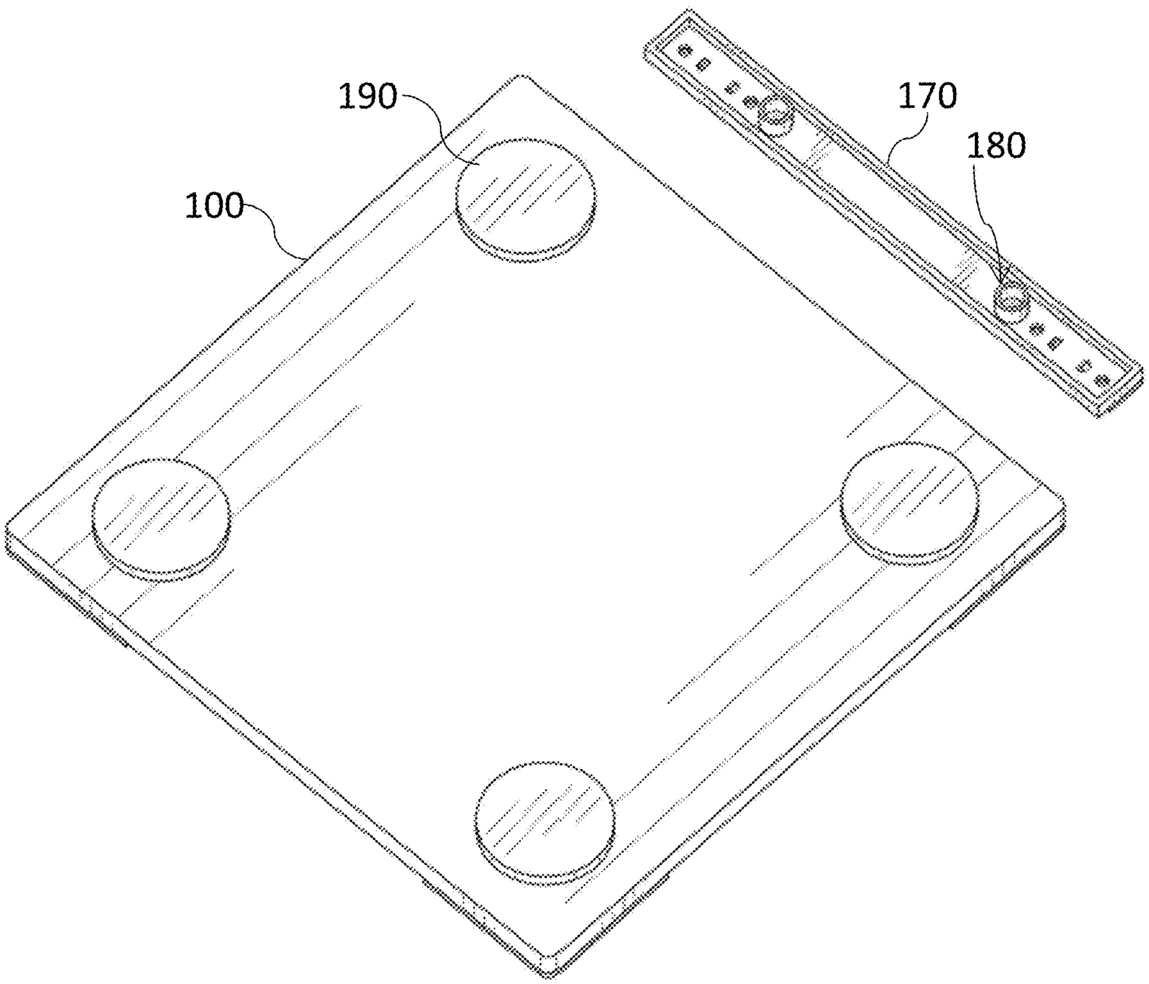
FIG. 7 shows another view of FIG. 6, according to an exemplary embodiment of the present invention.

Platform 120 may include side members that may be removed from the flat base. FIG. 6 shows a side member 170 removed from the flat base. The side member may include a part of the alignment tab 130. Removal of one or more side members may allow accommodating a larger size of artistic media. For example, a large-size paper can be accommodated while the end portion of the paper can extend from the removed side member. The side member and the flat base may have interlocking fasteners for removably attaching the side member. As shown in FIGS. 6 and 7, the removable side member 170 may include plugs 180 that may fit into sockets 194 in the flat base 110. Also, FIG. 7 shows four stopper pads 190 at the bottom of the flat base 110.

Figure 2:
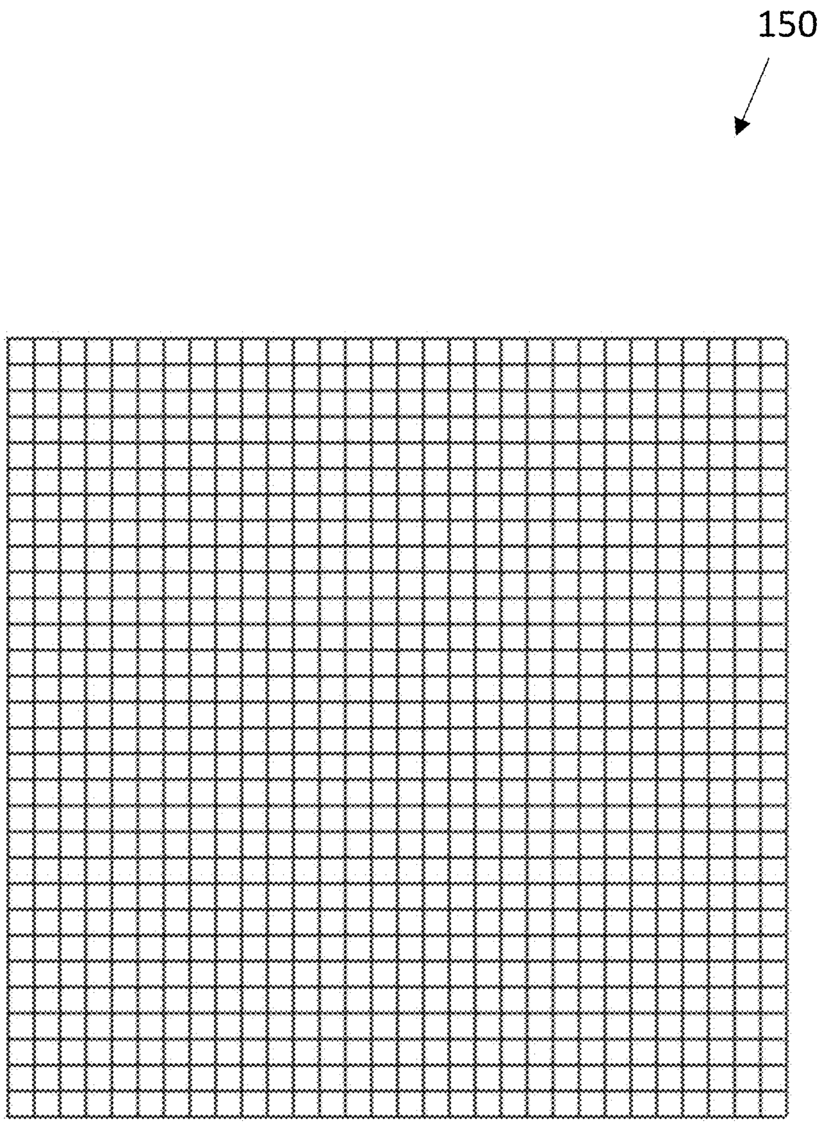
FIG. 2 shows a photopolymer film of the assembly, according to an exemplary embodiment of the present invention.

Referring to FIG. 2 which shows the photopolymer film 150. The photopolymer film has regularly spaced grid lines that may help to align the artistic media on the photopolymer film. It is to be noted that such grid lines may be optional. The photopolymer film 150 can be dimensioned to be placed onto flat base 110. The photopolymer film 150 being sticky may removably adhere to the flat base 110. The adhesive nature of the photopolymer film may ensure that the photopolymer film does not slip on the flat base. The artistic media on which patterns can be printed is placed on the photopolymer film. Artistic media can be aligned relative to the grids of photopolymer film. The photopolymer films may have a scale to aid in the alignment of the artistic media. Photopolymer may have just the right amount of stickiness for holding cardstock in place without causing it to tear upon removal.

Figure 3:
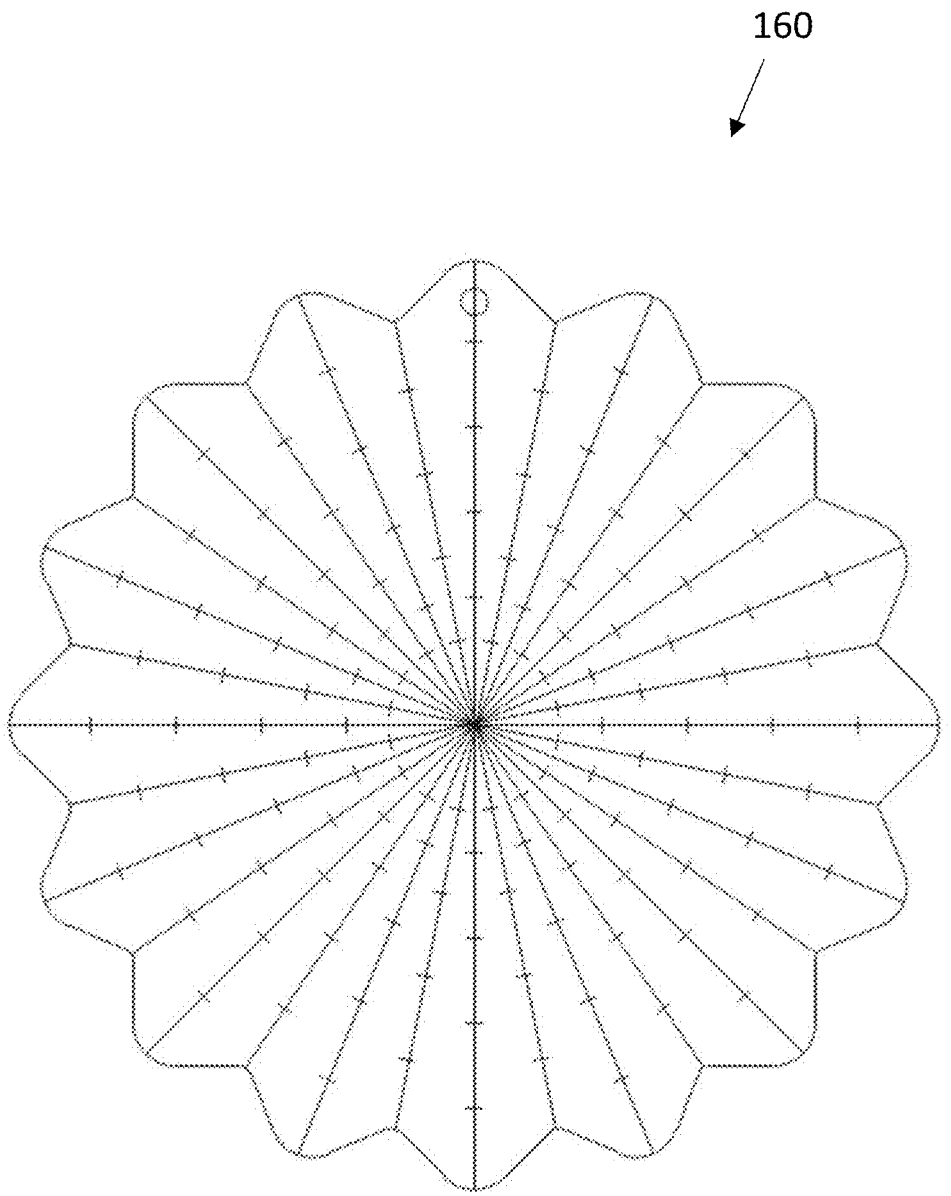
FIG. 3 shows a flip plate of the assembly, according to an exemplary embodiment of the present invention.

FIG. 3 shows the flip plate 160 of the assembly that can fit over platform 120. Four corners of the flip plate can be juxtaposed with the four alignment tabs on the corners of the platform, such that the flip plate can fit over the platform. The round shape of the corners of the flip plate 160 can be dimensioned to align to the round inner wall of the alignment tabs 130. The flip plate can snugly and smoothly slide through the alignment tabs and be placed on the platform, such as to prevent any lateral movement of the flip plate. Moreover, the sides of the flip plate can extend sidewards of the platform, which may allow the flip plate to be lifted by grabbing through hands. The flip plate may be transparent to translucent and have radial lines that extend from the center to the periphery of the flip plate. In one case, the radial lines can be etched on the clear flip plate. The radial lines may aid in the precise alignment of the photopolymer stamp relative to the artistic media.

Figure 4:
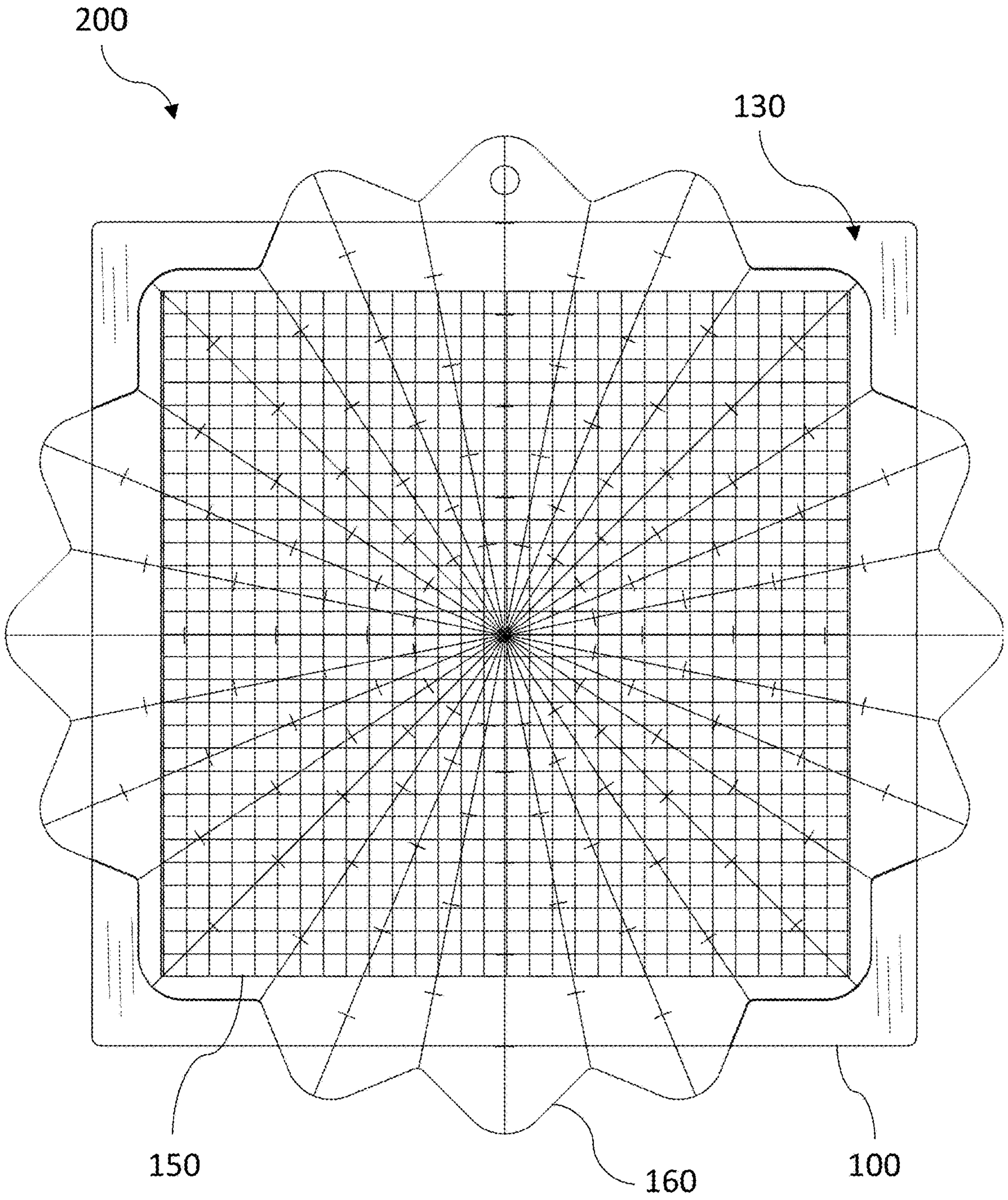
FIG. 4 shows the disclosed assembly, according to an exemplary embodiment of the present invention.
Figure 5:
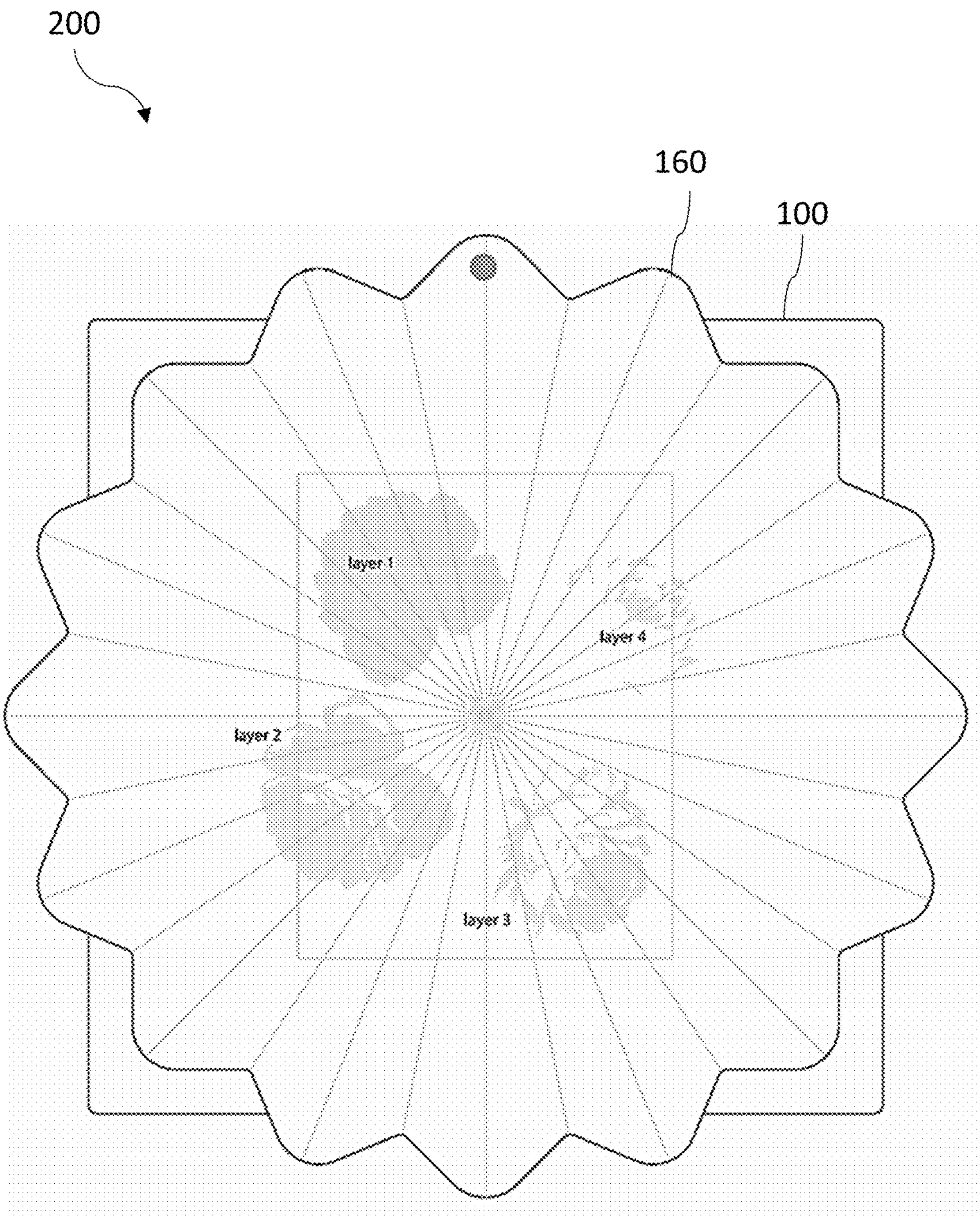
FIG. 5 shows the disclosed assembly, according to an exemplary embodiment of the present invention.

FIG. 4 shows the assembly 200 having the flat base on which the photopolymer film 150 is placed. Moreover, the flip plate 160 can also be seen placed on the platform. For stamping, the photopolymer film can adhere to the flat base. Thereafter, the card stock or similar artistic media can be placed over the photopolymer film. The card stock can be positioned relative to the photopolymer film, for example, the edges of the card stock can be aligned to the grid. Thereafter, the stamp can be placed on the desired position on the artistic media. Once the stamp is in place, the clear flip plate 160 can fit onto the platform, wherein corners of the flip plate 160 can be aligned to the alignment tabs 130 of the platform. The polymeric stamp adheres to the inner surface of the flip plate 160. Suitable pressure may be applied to the flip plate to adhere to the stamp. Once the stamp adheres to the flip plate, the flip plate can be removed and inverted. The ink can then be applied to the stamp. For example, the round ink pad can be used to transfer ink to the stamp. Thereafter, the clear flip plate can again be inverted and placed onto the platform. Moreover, slight pressure may also be applied to the flip plate to uniformly transfer the ink pattern to the artistic media. In case the ink is not uniform in the pattern, the process can be repeated i.e., the flip plate can be removed, and ink applied again to the stamp. The flip plate can then be put on the platform to transfer the ink to the artistic media.

The photopolymer film can be made of any soft material, such as rubber that adheres to the surface and resists slip. Any suitable material known to provide grips, such as slip-resistant rubber or silicone can be used. The photopolymer film can adhere to the top surface of the base so that the artistic media does not slip.

The removable side offers several advantages, such as larger paper can fit into the assembly without the need for trimming. Excess paper can extend beyond the edge of the frame at which the removal side has been removed. Also, larger stamps can be accommodated, wherein a part of the stamp can extend over the removable side member, ensuring better usage and flexibility.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An assembly for positioning a stamping tool, the assembly comprising:
- a frame comprising:
  - a base having a flat top surface, the base dimensioned to receive an artistic media;
  - an elevated platform along a periphery of the base, the elevated platform is of a predefined height relative to a top surface of the base, the elevated platform comprises one or more side members configured to be removably coupled to the base;
  - a plurality of alignment tabs at corners of the elevated platform, each of the plurality of alignment tabs has an inner side; and
- a flip plate dimensioned to fit over the elevated platform and between the plurality of alignment tabs, wherein the plurality of alignment tabs restricts lateral movement of the flip plate, wherein the flip plate is not fixedly fastened to the base.

2. The assembly according to claim 1, wherein the assembly further comprises:
- a photopolymer film dimensioned to be received over the base.

3. The assembly according to claim 1, wherein the flip plate has a plurality of radial lines that extends from a center of the flip plate up to its periphery, wherein the plurality of radial lines are configured to aid in precise alignment of the stamping tool relative to the artistic media.

4. The assembly according to claim 3, wherein the flip plate is transparent or translucent.

5. The assembly according to claim 1, wherein the base is a square having four corners, the elevated platform has a square periphery and four corners, and four alignment tabs are at the four corners of the elevated platform.

6. The assembly according to claim 1, wherein a plurality of side portions of the flip plate juxtaposes to the respective inner sides of the plurality of alignment tabs.

7. The assembly according to claim 6, wherein each inner side of the plurality of alignment tabs is concave in shape, and each of the plurality of side portions of the flip plate is rounded that corresponds to a concave inner side of the each of the plurality of alignment tabs.

8. The assembly according to claim 6, wherein the flip plate has a substantially round central section, the plurality of side portions comprises eight or more in multiples of four rounded side portions along a periphery of the substantially round central section and equally spaced from each other.

9. A method of stamping an artistic media using a photopolymer stamp, the method comprises:
- providing an assembly for positioning a stamping tool, the assembly comprising:
  - a frame comprising:
    - a base having a flat top surface, the base dimensioned to receive an artistic media;
    - an elevated platform along a periphery of the base, the elevated platform is of a predefined height relative to a top surface of the base, the elevated platform comprises one or more side members configured to be removably coupled to the base;
    - a plurality of alignment tabs at corners of the elevated platform, each of the plurality of alignment tabs has an inner side;
    - a flip plate dimensioned to fit over the elevated platform and between the plurality of alignment tabs, wherein the plurality of alignment tabs restricts lateral movement of the flip plate, wherein the flip plate is not fixedly fastened to the base; and
    - a photopolymer film configured to removably be placed onto the flat top surface of the base, the photopolymer film has a grid;
- removing a side member of the one or more side members from the base;
- placing the artistic media on the photopolymer film, the photopolymer film is on the flat top surface of the base;
- upon placing the artistic media, positioning the photopolymer stamp on the artistic media;
- upon positioning the photopolymer stamp, placing the flip plate on the elevated platform and between the plurality of alignment tabs, such as the photopolymer stamp adhering to a bottom surface of the flip plate;
- removing the flip plate from the elevated platform and thereafter inverting the flip plate;
- applying ink to an exposed surface of the photopolymer stamp adhered to the flip plate;

upon applying the ink, inverting, and repositioning the flip plate over the elevated platform, such as the photopolymer stamp contacts the artistic media.

10. The method according to claim 9, wherein the flip plate has a plurality of radial lines that extend from a center of the flip plate up to its periphery.

* * * * *